US011239728B2

(12) United States Patent
Borgarelli et al.

(10) Patent No.: US 11,239,728 B2
(45) Date of Patent: Feb. 1, 2022

(54) METHODS FOR ASSESSING PRESENCE OF ELECTRICAL, ELECTRONIC, AND/OR MECHANICAL FAULTS IN ELECTROMECHANICAL LINEAR ACTUATORS (71) Applicant: Umbragroup S.p.A., Foligno (IT)

(72) Inventors: Nicola Borgarelli, Foligno (IT); Luciano Pizzoni, Foligno (IT); Marco Nardeschi, Foligno (IT); Antonio Tomasiello, Foligno (IT)

(73) Assignee: UMBRAGROUP S.P.A., Foligno (IT)

( * ) Notice: Subject to any disclaimer, the term of this patent is extended or adjusted under 35 U.S.C. 154(b) by 222 days.

(21) Appl. No.: 16/617,656

(22) PCT Filed: May 30, 2018

(86) PCT No.: PCT/IB2018/053831
§ 371 (c)(1),
(2) Date: Nov. 27, 2019

(87) PCT Pub. No.: WO2018/220539
PCT Pub. Date: Dec. 6, 2018

(65) Prior Publication Data
US 2020/0186005 A1 Jun. 11, 2020

(30) Foreign Application Priority Data
May 30, 2017 (IT) .......................... 102017000058891

(51) Int. Cl.
F16H 25/20 (2006.01)
H02K 7/06 (2006.01)

(52) U.S. Cl.
CPC .............. H02K 7/06 (2013.01); F16H 25/20 (2013.01); F16H 2025/2059 (2013.01); F16H 2025/2075 (2013.01)

(58) Field of Classification Search
CPC ............. F16H 25/20; F16H 2025/2059; F16H 2025/2075; H02K 7/06
See application file for complete search history.

(56) References Cited

U.S. PATENT DOCUMENTS 3,343,427 A * 9/1967 Silvestri ................ F16H 25/205
74/89.38
4,179,944 A 12/1979 Conner
(Continued)

FOREIGN PATENT DOCUMENTS

EP  1359345 A2  11/2003
EP  1359345 A3  4/2006
(Continued)

OTHER PUBLICATIONS

International Search Report and Written Opinion of the International Searching Authority, dated Sep. 4, 2018, in corresponding International Application No. PCT/IB2018/053831, 14 pages.
(Continued)

Primary Examiner — David M Fenstermacher
(74) Attorney, Agent, or Firm — MH2 Technology Law Group LLP (57) ABSTRACT An electromechanical linear actuator may include: a containment structure; first and second lead nuts; two electric motors operably connected to rotate the lead nuts; a shaft inserted in the lead nuts; and coupling means with an intermediate coupling stage configured to mechanically couple the lead nuts with the shaft. A method of assessing fault in an electromechanical linear actuator may include: actuating the electric motors to drive the lead nuts in a same direction of rotation or in opposite directions of rotation; during the actuating of the electric motors, checking whether or not the shaft translates relative to the containment structure; checking for mechanical failure of the intermediate coupling stage with either lead nut, to actuate the electric
(Continued)

motors in the same direction of rotation; and checking for mechanical failure of the shaft with the intermediate coupling stage, to actuate the electric motors in the opposite directions of rotation.

9 Claims, 6 Drawing Sheets

(56) References Cited

U.S. PATENT DOCUMENTS

| | | | | |
|---|---|---|---|---|
| 4,614,128 A * | 9/1986 | Fickler | ............... | F16H 25/2018 74/89.31 |
| 4,637,272 A * | 1/1987 | Teske | ............... | F16H 25/205 74/89.26 |
| 4,858,491 A * | 8/1989 | Shube | ............... | F16H 25/205 74/665 B |
| 4,876,906 A * | 10/1989 | Jones | ............... | B64C 13/42 74/89.25 |
| 5,041,748 A * | 8/1991 | Huber | ............... | H02K 7/06 310/80 |
| 5,214,972 A | 6/1993 | Larson et al. | | |
| 6,247,667 B1 * | 6/2001 | Fenny | ............... | B64C 29/0033 244/56 |
| 7,044,012 B2 | 5/2006 | Dubus et al. | | |
| 8,230,750 B2 * | 7/2012 | Flatt | ............... | B64C 13/341 74/89.38 |
| 8,310,193 B2 * | 11/2012 | Harke | ............... | G05D 23/1919 318/561 |
| 8,702,035 B2 * | 4/2014 | Elliott | ............... | B64C 25/20 244/102 R |
| 9,024,491 B2 * | 5/2015 | Wakita | ............... | H02K 16/00 310/80 |
| 9,534,644 B2 * | 1/2017 | Spina | ............... | F16D 37/008 |
| 10,630,138 B2 * | 4/2020 | Hemphill | ............... | H02K 7/06 |
| 10,975,940 B2 * | 4/2021 | Laskovy | ............... | B64C 13/32 |
| 10,994,324 B2 * | 5/2021 | Huber | ............... | B21J 9/025 |
| 11,105,404 B2 * | 8/2021 | Borgarelli | ............... | F16H 25/205 |
| 2005/0269887 A1 | 12/2005 | Blanding et al. | | |
| 2010/0242643 A1 | 9/2010 | Waide | | |
| 2013/0249464 A1 | 9/2013 | Knox et al. | | |
| 2015/0276029 A1 | 10/2015 | Marvin et al. | | |
| 2015/0308549 A1 | 10/2015 | Hirai et al. | | |

FOREIGN PATENT DOCUMENTS

| | | |
|---|---|---|
| WO | 2007024220 A1 | 3/2007 |
| WO | 2010027701 A1 | 3/2010 |

OTHER PUBLICATIONS

International Search Report and Written Opinion of the International Searching Authority, dated Oct. 8, 2018, in related International Application No. PCT/IB2018/053852, 13 pages.

International Preliminary Report on Patentability, dated Sep. 16, 2019, in related International Application No. PCT/IB2018/053852, 7 pages.

* cited by examiner

METHODS FOR ASSESSING PRESENCE OF ELECTRICAL, ELECTRONIC, AND/OR MECHANICAL FAULTS IN ELECTROMECHANICAL LINEAR ACTUATORS

CROSS-REFERENCE TO RELATED APPLICATION(S)

This application is a national stage entry from International Application No. PCT/IB2018/053831, filed on May 30, 2018, in the Receiving Office ("RO/IB") of the International Bureau of the World Intellectual Property Organization ("WIPO"), and published as International Publication No. WO 2018/220539 A1 on Dec. 6, 2018. International Application No. PCT/IB2018/053831 claims priority from Italian Patent Application No. 102017000058891, filed on May 30, 2017, in the Italian Patent and Trademark Office ("IPTO"). The entire contents of all of these patent applications and publications are incorporated herein by reference.

DESCRIPTION

Field of the Invention

The present disclosure relates to a method of assessing the presence of an electrical, electronic and/or mechanical fault in an electromechanical linear actuator as defined in the preamble of claim 1.

Particularly, but without limitation, the actuator is an electromechanical linear actuator for controlling a control surface of an aircraft, a boat or the steering system of a vehicle or similar applications.

Description of Prior Art

Electromechanical linear actuators are known, which are equipped with command and control electronics, are driven by an electric motor, and have the task of converting the rotary motion of the electric motor into a reciprocating linear motion of a pushing member to control the position of a control surface.

For this purpose, the electric motor is connected via a reduction apparatus to the pushing member, which is in turn connected to the control surface to control the position that this surface is to assume in response to the controls received from the command and control electronics.

Usually, the reduction apparatus comprises a lead nut with a screw sliding thereon (or a screw with a lead nut sliding thereon), which in turn is connected to the pushing member and, whereby a rotation-preventing device, only is allowed to the screw (or the lead nut) the only a linear and non-rotational movement of the screw, thereby providing the linear reciprocating motion of the pushing member.

Such electromechanical linear actuators have been used, for example, to control the secondary control surfaces of an aircraft, such as air brakes, spoilers, flaps, trim tabs, but also to open hatches and other uses requiring low power, speed and responsiveness i.e. for the so-called "non-safety critical" applications.

However, the reliability of an electromechanical actuator as defined above does not allow it to be used in installations designed to control primary control surfaces of an aircraft, the swash plate of a helicopter, the steering system of a vehicle or the rudder of a ship, i.e. more generally all "safety critical" applications.

This is because the above described electromechanical actuator is poorly reliable both in its electrical part, i.e. the electric motor, and in the command and control electronics, as well as the possibility of a seizure of the mechanical part (the so-called mechanical "jamming").

In an attempt to obviate this drawback, architectures have been used which either include two identical actuators that move the same control surface, thereby providing electrical, electronic and mechanical redundancy, but also increasing the weight and complexity of the system, or have a single actuator equipped with a differential gear box, which affords the use of two independent electric motors and two independent electronics to move the same mechanical system.

U.S. Pat. No. 4,179,944 discloses an exemplary electromechanical linear actuator having two motors directly coupled to a shaft via ball nuts. This electromechanical actuator does not provide enough redundancy to ensure fault tolerance against both mechanical and electrical and electronic faults. This electromechanical actuator only affords detection of two types of mechanical faults, mainly associated with the moving shaft, thereby only providing limited redundancy, especially for mechanical faults occurring between the motor and the shaft. Furthermore, this electromechanical actuator might be problematic in case of electrical and/or electronic fault associated with the electric motors. Such motors should be sized to ensure operation both in a fully operational state and in a failure state, e.g. to overcome torques caused by mechanical faults, when either motor is stalled.

Prior Art Problem

Nevertheless, the need is increasingly felt to be able to detect electrical, electronic and/or mechanical faults, and particularly "latent failures" of the actuator/s that are part of the above described architectures. Latent failures are known as failures that may occur in a mechanical or electrical/electronic component, in a circuit or in a system, and that have not appeared yet, although the event that triggers them has already occurred, with the architecture still being able to be operated.

Namely, the above described architectures are tested during scheduled periodic inspections and, if no anomaly is detected, such architectures are deemed to be fully efficient and hence operable. Nevertheless, undetected and/or undetectable failures might occur during use, and reduce efficiency more or less severely, but these failures will be hidden until the next inspection, thereby affecting the safety provided by redundancy.

This is a serious problem, especially when the electromechanical actuator is employed in safety critical applications.

SUMMARY OF THE INVENTION

The object of the present invention is to provide a method of assessing the presence of an electrical, electronic and/or mechanical fault in an electromechanical linear actuator that can solve the above described prior art problems, This object is fulfilled by a method of assessing the presence of an electrical, electronic and/or mechanical fault in an electromechanical linear actuator, as defined in the annexed claim 1.

Advantages of the Invention

One embodiment of the present invention provides a method of assessing the presence of electrical, electronic and/or mechanical faults, such as latent failures, in an electromechanical linear actuator of the Fault Tolerant Differential Direct Drive type.

Furthermore, one embodiment of the present invention provides a method that can identify the type of failure in an electromechanical linear actuator. Particularly, due to the introduction of an intermediate stage between the lead nuts and the shaft, the electromechanical linear actuator ensures greater reliability as compared with the above discussed prior art.

Furthermore, one embodiment of the present invention provides a method that can identify the type of mechanical failure in the electromechanical linear actuator and can actuate the electric motors to overcome the identified failure. Particularly, the actuator is equipped with a number of sensors that cooperate to identify the type of failure.

BRIEF DETAILS OF THE DRAWINGS

The characteristics and advantages of the present disclosure will appear from the following detailed description of a possible practical embodiment, illustrated as a non-limiting example in the set of drawings, in which.

DETAILED DESCRIPTION

Even when this is not expressly stated, the individual features as described with reference to the particular embodiments shall be intended as auxiliary to and/or interchangeable with other features described with reference to other exemplary embodiments.

Figure 1A:
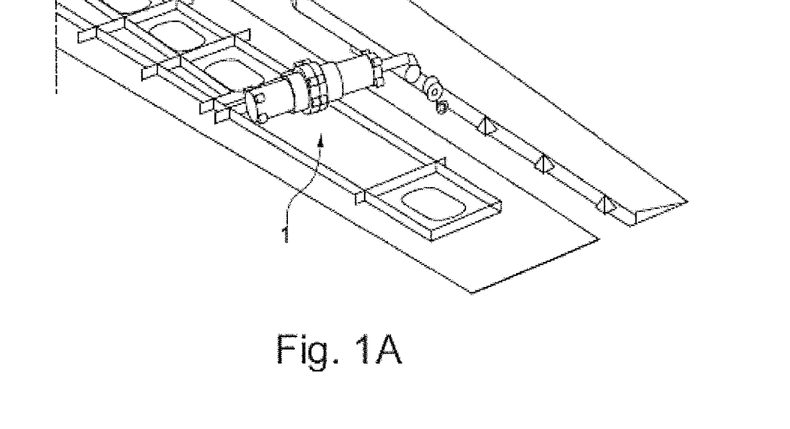
FIGS. 1A and 1B show two possible implementation scenarios for the electromechanical linear actuator, FIG. 1A schematically depicting a primary control surface of an aircraft operated by a single-acting actuator (with a single pushing member projecting out of one side of the actuator) and FIG. 1B schematically depicting a steering assembly of a vehicle operated by a double-acting actuator (with two pushing member projecting out of both sides of the actuator)
Figure 1B:
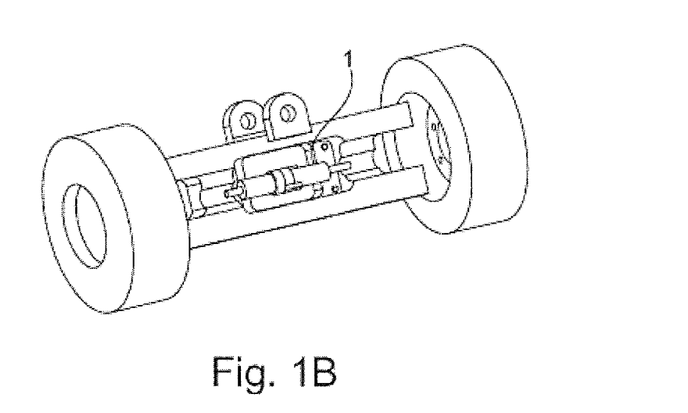

Referring to the accompanying figures, numeral 1 generally designates an electromechanical linear actuator of the present invention and particularly FIG. 1A schematically depicts a primary control surface of an aircraft operated by the single-acting actuator 1 (i.e. having a single pushing member projecting out of one side of the actuator) and FIG. 1B schematically depicts a steering assembly of a vehicle operated by a double-acting actuator (i.e. having two pushing members projecting out of both sides of the actuator).

Figure 2:
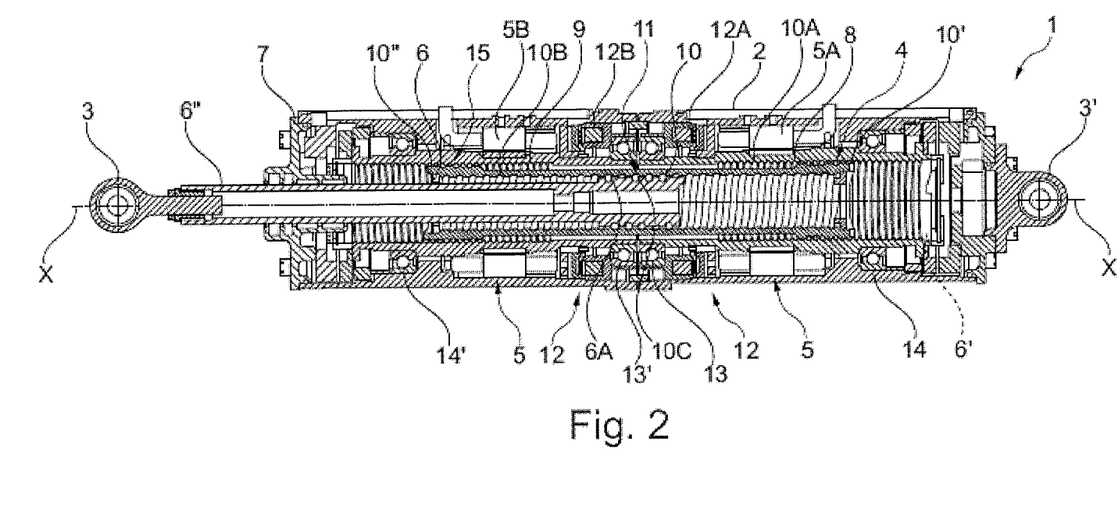
FIG. 2 shows a sectional view of the electromechanical linear actuator according to a first embodiment.
Figure 3:
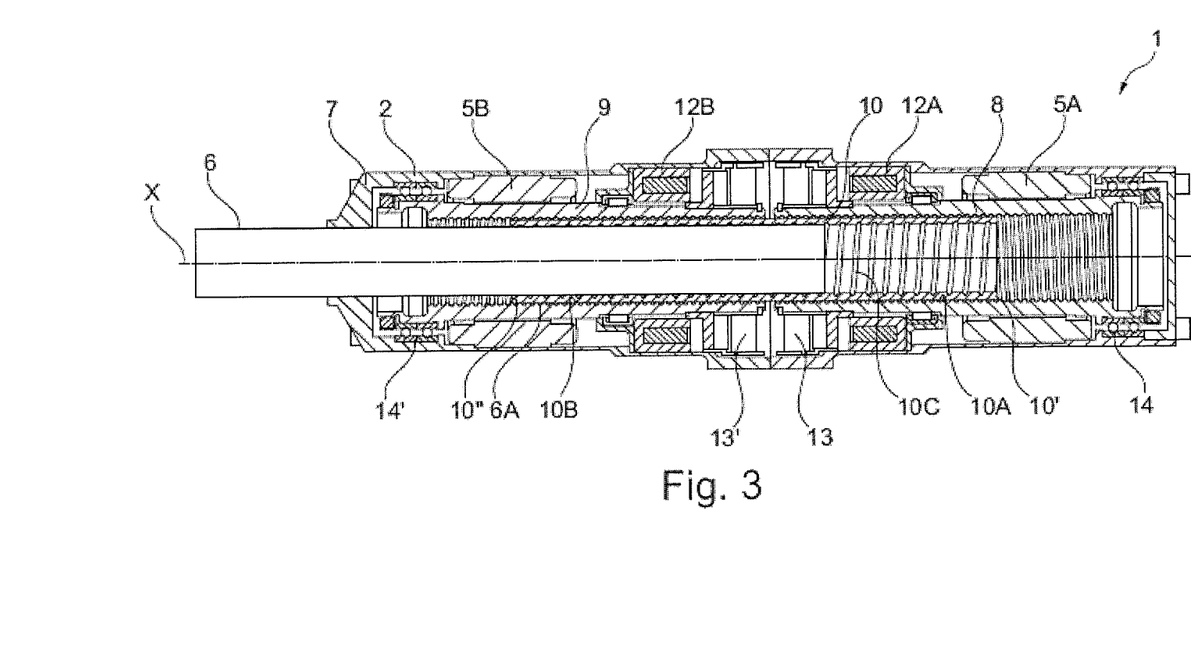
FIG. 3 shows another sectional view of the first embodiment of the present invention, depicted more schematically to highlight the characteristic features of the actuator.
Figure 4:
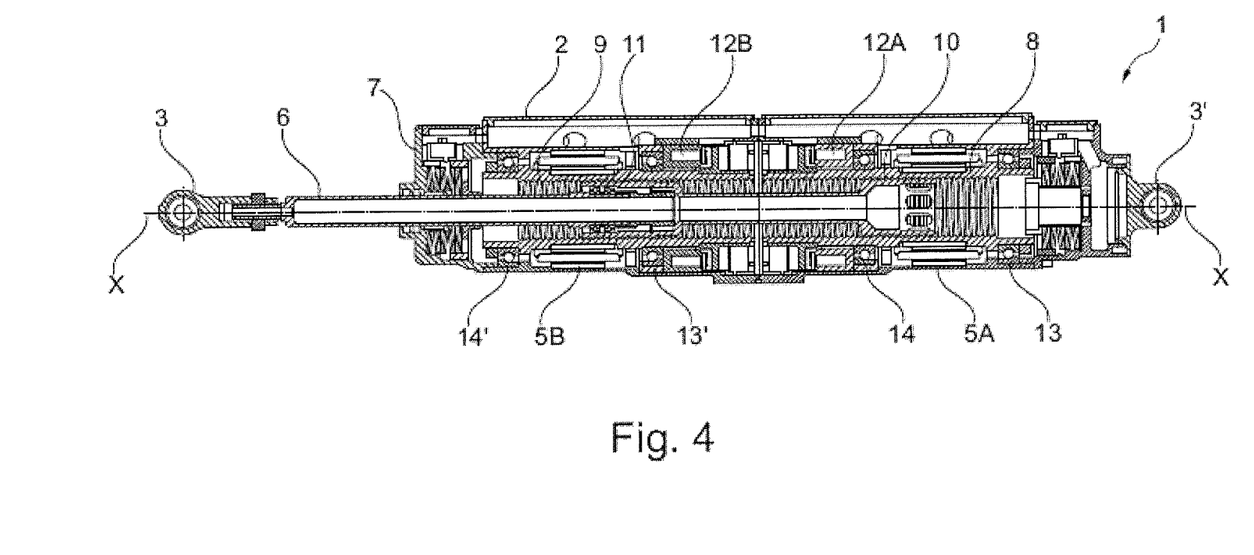
FIG. 4 shows a sectional view of the electromechanical linear actuator according to a second embodiment.
Figure 5:
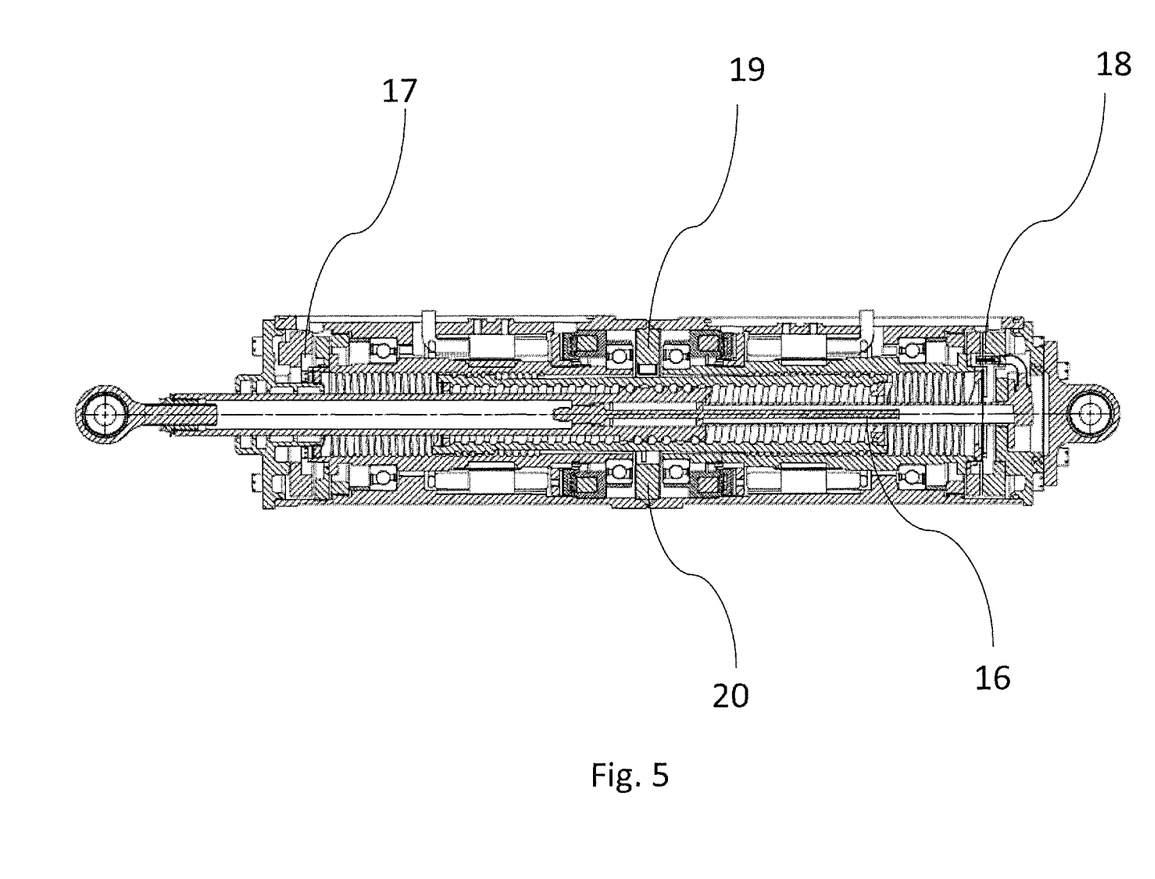
FIG. 5 shows a sectional view of the electromechanical linear actuator highlighting additional characteristic features of the actuator.

Referring to FIGS. 2 to 4, the actuator 1 comprises a containment structure 2 preferably rigid, and a pushing member 3.

The pushing member 3 constitutes the active element of the actuator 1.

Particularly, the pushing member 3 is designed to translate, relative to the containment structure 2, to at least partially come out of the containment structure 2 during operation of the actuator 1.

The pushing member 3 translates through a special aperture formed in the containment structure 2.

The actuator 1 comprises a mechanical reduction apparatus 4, disposed in the containment structure 2, and configured to rotate about an axis of rotation X.

The actuator 1 comprises motor means 5, disposed in the containment structure 2, which are operatively connected with the mechanical reduction apparatus 4 to rotate it about the axis X.

The actuator 1 comprises a shaft 6, which fits into the mechanical reduction apparatus 4, and is connected with the pushing member 3.

Particularly, the shaft 6 comprises a first terminal end 6' and a second terminal end 6", where the first terminal end 6' is connected to a coupling eye 3'. The second terminal end 6" may come out of the containment structure 2 with the pushing member 3 at least partially during operation of the actuator 1.

The actuator 1 comprises a rotation-preventing mechanism 7 which is operable on the shaft 6 to prevent the shaft from rotating about the axis of rotation X.

Therefore, the shaft 6 is connected with the mechanical reduction apparatus 4 in such a manner that a rotation of the mechanical reduction apparatus 4 will cause a translation of the shaft 6 along the axis of rotation X and hence a linear reciprocating motion of the pushing member 3.

Advantageously, the mechanical reduction apparatus 4 comprises a first lead nut 8 and a second lead nut 9 which are independent of each other, i.e. two separate and distinct lead nuts.

Each lead nut 8, 9 has its own thread and its own thread direction, and is adapted to rotate about the axis of rotation X under the action of the motor means 5.

Each lead nut 8, 9 has a main direction of extension which coincides with the aforementioned axis of rotation X.

Each lead nut 8, 9 is enabled to only rotate about the axis of rotation X while to each of them the translation along the axis of rotation X is prevented, for example by means of appropriate stopping shoulders or other solutions known to the skilled person and not described herein.

In order to allow each lead nut 8 and 9 to rotate about the axis of rotation X, the actuator 1 comprises a pair of bearings 13-14 and 13'-14' for each lead nut, disposed in the containment structure 2.

For example, the pair of bearings 13-14 are designed for the lead nut 8 and 13'-14' are designed for the lead nut 9.

Thus, the lead nuts 8 and 9 are able to rotate about the axis of rotation X under the action of the motor means 5, which are connected to the lead nut or by means of a kinematic chain (e.g. a gear box comprising differential gearing), or are preferably directly connected to such lead nuts as better explained hereafter.

In one aspect, the mechanical reduction apparatus 4 comprises coupling means 10, 11 and 15, which are configured to mechanically couple the first and second lead nuts 8, 9 with the shaft 6, so that a rotational movement of the first and/or second lead nuts 8, 9 will cause a translation of the shaft 6 along the axis of rotation X.

In other words, the actuator 1 is able to ensure a translation of the shaft 6 along the axis of rotation X even in failure conditions of the motor means 5, or their respective electronics, or in case of jamming of the coupling means 10, 11 and 15 with one of the two either of the lead nuts 8, 9 indistinctly.

This is achieved without using differential systems, such as gear boxes.

For this purpose, the coupling means 10, 11 and 15 comprise:

an intermediate coupling stage 10 inserted inside the first and second lead nuts 8, 9.

respective first mechanical connection means 15 configured to mechanically couple each lead nut 8 and 9 with the intermediate coupling stage 10;

second mechanical connection means 11.

Particularly, the shaft 6 is fitted into the intermediate coupling stage 10 and is connected with the latter via the second mechanical connection means 11.

In one aspect, the intermediate coupling stage 10, extends about an axis that coincides with the aforementioned axis of rotation X.

The intermediate coupling stage 10 has an inner cavity, preferably a through cavity, which extends along an axis that coincides with the aforementioned axis of rotation X, and which imparts a tubular shape to such intermediate coupling stage 10.

Therefore, also referring to FIGS. 2 to 4, the shaft 6 is coaxial with both the intermediate coupling stage 10 and the first and second lead nuts 8 and 9 along the axis of rotation X, so as the intermediate coupling stage 10 is coaxial with the first and second lead nuts 8 and 9 still along the axis of rotation X.

In one aspect, still referring to FIGS. 2 to 4, it shall be noted that the first mechanical connection means 15 preferably comprise a nut and screw coupling or, alternatively, a satellite roller or recirculating roller coupling or a recirculating ball screw.

Referring now to FIGS. 2 and 3, which shows a preferred embodiment of the coupling between the intermediate stage 10 and the shaft 6, it shall be noted that the shaft 6 is a screw shaft and the second mechanical connection means 11 comprise a nut and screw coupling between the screw shaft 6 and the intermediate coupling stage 10.

With this embodiment, a rotary motion imparted by the motor means 5 to the first and/or second lead nuts 8, 9, will cause a rotational, translational or rototranslational movement of the intermediate coupling stage 10 along the axis of rotation X, and the intermediate coupling stage 10 will in turn cause a translational movement of the screw shaft 6 along said axis of rotation X.

Therefore, in the preferred embodiment, the intermediate coupling stage 10 is interconnected with each lead nut 8 and 9 via a respective nut and screw coupling obtained with the respective first mechanical connection means 11 and after a rotation of the first lead nut 8 and/or the second lead nut 9 imparted by motor means 5, will cause a rotational, translational, or rototranslational movement of the intermediate coupling stage 10 along the axis of rotation X, and that the latter, i.e. the intermediate coupling stage 10, will cause a translational displacement of the screw shaft 6 along said axis of rotation X.

For this purpose, in the preferred embodiment, the intermediate coupling stage 10 has externally a first external thread 10A and a second external thread 10B i.e. formed on its outer surface, each being designed to be coupled with a respective thread of a lead nut 8 or 9.

For example, the first thread 10A is coupled with the thread of the lead nut 8 and the second thread 10B is coupled with the thread of the lead nut 9.

In one aspect, it is expected that the first thread 10A is located proximate to a first terminal end 10' of the intermediate coupling stage 10 and said second thread 10B is located proximate to a second terminal end 10" opposite to the first terminal end 10' of the intermediate coupling stage 10.

These first and second threads 10A and 10B preferably cover only a portion of the outer surface of the intermediate coupling stage 10, and particularly a portion that starts from the respective terminal ends 10', 10" and extends toward the central zone of the intermediate coupling stage 10.

Since the first lead nut 8 and the second lead nut 9 are independent of each other but are still mechanically connected by the engagement of the screw lead nut with the intermediate coupling stage 10, then also the first and second threads 10A and 10B of the intermediate coupling stage 10 are fastened together, as they are formed on the same outer surface of the intermediate element 10.

In one aspect, still in the preferred embodiment of the actuator 1 as shown in FIGS. 2 and 3, it is expected that the intermediate coupling stage 10 has internally to have a third internal thread 10C, i.e. formed on its inner surface, which is designed to be coupled with a thread 6A of the screw shaft 6, such thread 6A being formed on the outer surface of the screw shaft.

In other words, the screw shaft 6 has the thread 6A with a given pitch and a given direction, which is interconnected with the third thread 10C formed in the intermediate coupling stage 10, such that a nut and screw coupling is created thereby.

In one aspect, the pitch of the thread 6A of the screw shaft 6 is different from, for instance greater or smaller than, the pitch of the thread of the first and second lead nuts 8 and 9.

Particularly:

the thread direction of the first lead nut 8 is left-handed, whereas the one of the second lead nut 9 is right-handed, or vice versa (i.e. the thread direction of the first lead nut 8 is right-handed and the one of the second lead nut 9 is left-handed).

Referring now to FIG. 4, which shows a possible embodiment of the coupling between the intermediate stage 10 and the shaft 6 (which is not a screw shaft as shown in FIG. 2), it shall be noted that the second mechanical connection means 11 are embodied by bearings. If the coupling between the intermediate stage 10 and the shaft 6 is provided by bearings, then the shaft 6 will only translate in response to a translation or rototranslation of the intermediate stage 10.

If the intermediate stage 10 rotates, then the shaft 6 cannot translate. In this case, the actuator 1 still ensures electrical and electronic redundancy, but loses its mechanical redundancy (jamming). For example, if jamming occurs between a lead nut 8 or 9 and the intermediate stage 10, then the intermediate stage 10 will not be able to translate and then it can not drive the shaft 6.

In other words, in the arrangement of FIG. 4, i.e. with the presence of bearings between the intermediate stage and the shaft, the method of the present disclosure can assess whether a latent failure exists in the electrical and electronic part, but cannot assess whether such a failure exists in the mechanical part, as the latter has no redundancy.

Alternatively, the second mechanical connection means 11 can be embodied by a satellite rollers or recirculating roller coupling or a recirculating ball screw.

As discussed above, the lead nuts 8 and 9 are able to rotate about the axis of rotation X under the action of the motor means 5, which are preferably directly connected to such lead nuts.

For this purpose, regardless of the embodiment as shown in FIGS. 2 and 3 or 4, the motor means 5 comprise two electric motors 5A and 5B, each being directly operable on a respective lead nut 8 or 9.

Particularly, each electric motor 5A, 5B comprises a stator fixed to the containment structure 2 and a rotor fixed to its respective lead nut 8, 9.

Therefore, the rotor of each electric motor 5A and 5B is rigidly connected with a respective lead nut 8 or 9, one or both of the latter being rotated by the electromagnetic interaction of their respective rotors (generally with permanent magnets) and the stators.

For example, also referring to FIG. 3, it shall be noted that the rotor of the electric motor 5A is fixed to the first lead nut 8, whereas the rotor of the motor 5B is fixed to the second lead nut 9.

In an alternative embodiment, the motor means 5 are designed to be connected with a respective lead nut 8 or 9 via a kinematic chain (not shown) to distribute the torque to one and/or both of said first and second lead nuts 8 and 9.

The actuator 1 comprises braking means 12, operable on the first and/or second lead nuts 8, 9 to brake the rotation about the axis of rotation X of one and/or both of said first and second lead nuts, according to the operating conditions of the actuator 1 as described in greater detail hereinafter.

Particularly, the braking means 12 comprise two electric brakes 12A and 12B, each operable on a respective lead nut 8 or 9.

Here, the brakes are, for example, electromagnetic coil brakes. Namely, they are of the normally open configuration (with the brake being closed by actuating the electromagnet), or of the normally closed configuration (with the brake being opened by actuating the electromagnet).

For example, also referring to FIG. 3, it shall be noted that the brake 12A operates on the first lead nut 8, and the brake 12B operates on the second lead nut 9.

It shall be noted that each electric motor 5A and 5B as well as each electric brake 12A and 12B is controlled by its own control electronics (not shown), which is designed to check and command the operating state and effectiveness of the aforementioned electric motors 5A and 5B and electric brakes 12A and 12B. The actuator comprises a plurality of sensors 16-20, arranged within the containment structure 2 and suitably configured to be in signal communication with the command and control electronics, and designed to detect the position of the shaft 6, to thereby detect its movements along the axis X.

Particularly, the actuator 1 comprises three types of sensors:
- at least one linear sensor 16, which is placed inside of the screw shaft 6 and is configured to detect the axial position of the shaft 6;
- first 17 and second 18 rotary sensors, each associated with a respective lead nut 8, 9 and each configured to detect the rotation of each lead nut 8, 9;
- at least one proximity sensor 19, 20 located between the two lead nuts 8, 9 and configured to read the axial position of the intermediate coupling stage 10.

These sensors 16, 17, 18, 19, 20 are connected via the command/control electronics and appropriate software to monitor the relative movements between the screw shaft 6, the lead nuts 8, 9, the intermediate coupling stage 10 and the containment structure 2.

More in detail, the proximity sensor 19, 20 and the linear sensor 16 can ensure homing of the rotary sensors 17, 18 located proximate to each lead nut 8, 9. Advantageously, the proximity sensor 19, 20 and the linear sensor 16 identify a reference point for the first 17 and second 18 rotary sensors to obtain the position of the two lead nuts 8, 9.

Advantageously, the presence of multiple sensors 16, 17, 18, 19, 20 ensures redundancy for measuring the axial position of the screw shaft 6.

It shall be noted that two sensors of the plurality 16, 17, 18, 19, 20 might be sufficient to obtained the axial position of the screw shaft 6, by mechanical correlations.

Nevertheless, using the plurality of sensors 16-20 as described above, the actuator 1 will be able to tolerate the failure of up to two sensors.

Advantageously, the control/command electronics correlates the outputs of the sensors 16, 17, 18, 19, 20 to identify a mechanical failure (i e jamming) between the screw shaft 6 and the intermediate coupling stage 10 or between the lead nuts 8, 9 and the intermediate coupling stage 10.

Therefore, in the preferred embodiment as described herein (i.e. the one as shown in FIG. 2 or 3), the actuator 1 comprises two independent electric motors 5A and 5B and two independent electronics for driving fully redundant mechanics (i.e. two lead nuts 8 and 9, an intermediate stage 10 and a screw shaft 6) without using gear boxes and comprises the use of two independent lead nuts 8 and 9, one with a right-handed thread direction and the other with a left-handed thread direction, with which the rotors of the two electric motors 5A and 5B are directly connected. The two lead nuts 8 and 9 engage the intermediate stage 10 which has two distinct external threaded portions 10A and 10B, one engaged with the left-handed lead nut and the other engaging the right-handed lead nut. Therefore, the intermediate stage 10 has a thread 10C that engages the thread 6A of the screw shaft 6 which does not rotate thanks to the rotation-preventing device 7.

It should be further noted, still in the preferred embodiment as described herein, that the right-handed and left-handed coupling between the intermediate stage 10 and the respective lead nuts 8 and 9, can indicate the position of the intermediate stage 10 with respect to the lead nuts and the screw shaft 6. This will define a much smaller positioning range in which jamming may occur between the intermediate stage 10 and the lead nuts 8 and/or 9 or between the intermediate stage 10 and the screw shaft 6 as compared with prior art actuators. Thus, a much more compact actuator will be advantageously obtained, which has a lighter weight while ensuring that the actuator 1 will cover its entire stroke even under a jamming condition.

Figure 6:
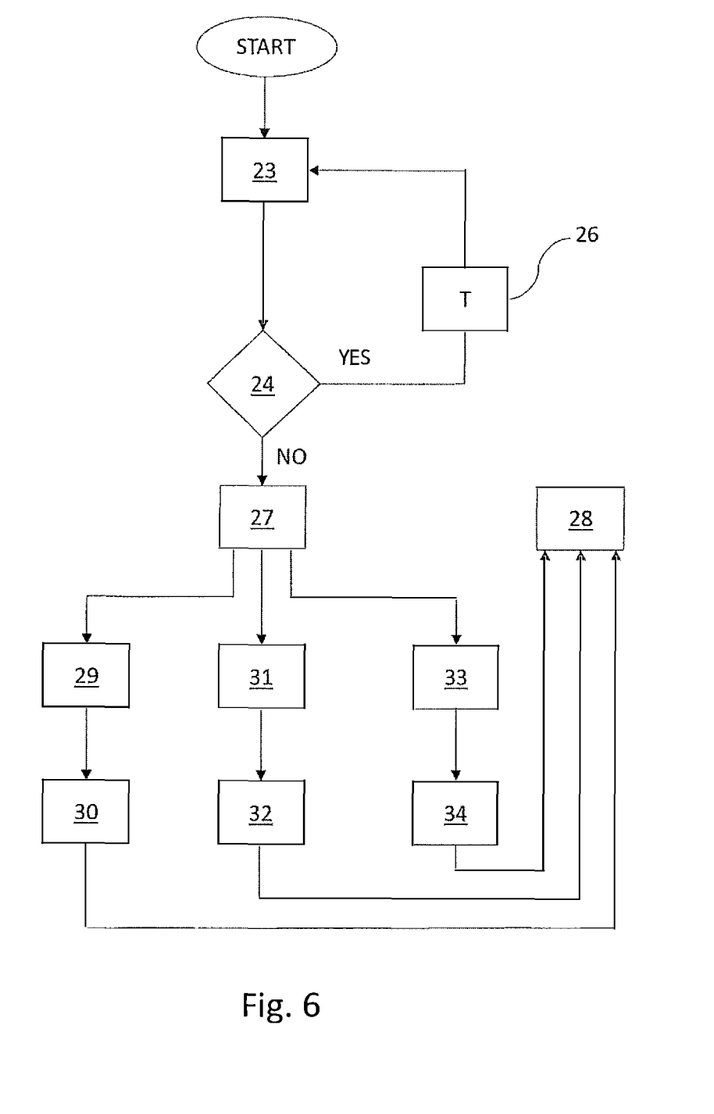
FIG. 6 shows a flow chart of the method of assessing the presence of an electrical, electronic and/or mechanical fault in an electromechanical linear actuator, according to the present invention.

The method of assessing the presence of any problem or fault, particularly latent failures, in an electromechanical actuator 1 will be now described, also with reference to FIG. 6, with reference to its preferred embodiment, i.e. the embodiment as shown in FIG. 2 or 3.

Fault Assessment Mode

During normal operation, the two electric motors 5A and 5B may drive the two lead nuts 8 and 9, upon request by respective electronics, in the same direction of rotation or in opposite directions of rotation.

If the operation of the two motors 5A and 5B moves the two lead nuts 8 and 9 in the same direction of rotation, then the intermediate stage 10 rotates in rigidly joined fashion with the two lead nuts 8 and 9. Due to the rotation-preventing device 7, the screw shaft 6 translates.

If the operation of the two motors 5A and 5B moves the two lead nuts 8 and 9 in opposite directions, then the torque of one motor is counterbalanced by the torque of the other motor and the intermediate stage 10 translates. The screw shaft 6 translates in rigidly joined fashion with the intermediate stage 10.

As a result, in the fault assessment mode, the intermediate stage 10 may rotate, translate or roto-translate and the screw shaft 6, due to the presence of the rotation-preventing device 7, translates along the axis of rotation X to thereby provide a linear reciprocating motion, still along the axis of rotation X of the pushing member 3.

In one aspect, the presence of electric, electronic, and/or mechanical faults, particularly latent failures in the electromechanical linear actuator 1 may be assessed through the following steps:
- actuating the two electric motors 5A, 5A, block 23, to drive the first and second lead nuts 8, 9 in the same direction of rotation or in opposite directions of rotation;
- during said step of actuating the two electric motors 5A, 5B, checking, block 24, whether the shaft 6 translates relative to said containment structure 2.

Particularly, due to the command and control electronics and due to the plurality of sensors 16-20 it is possible identify whether the shaft 6 actually translates relative to the containment structure 2.

In one aspect, if no fault is detected, branch YES of block 24, then the step of actuating the two electric motors 5A, 5B will be carried out with a predetermined actuating range T, block 26.

For example, the actuating range of T may have a constant or variable repetition frequency.

If the shaft 6 does not translate relative to the containment structure 2, branch NO of block 24, then it is planned to intervene according to one of the modes designed do ensuring correct operation of the actuator 1, block 27 step of determining the type of fault, and the step of notifying the type of failure that has been detected, block 28.

Particularly, if the command and control electronics does not detect a translation of the shaft 6, then the monitoring electronics will enter a so-called failure mode.

For this purpose, the command and control electronics will identify, using the sensors 16-20, which electric or electronic component (for example one of the two electric motors or the electronics itself) or mechanical component (e.g. jamming of the intermediate stage of the screw with either of the lead nuts or jamming of the screw shaft with the intermediate stage of the screw) is faulty.

The modes for locating and repairing a fault in an electrical or electronic part or a mechanical part of the actuator 1 will be described below.

In these scenarios, the method always includes notification of the detected fault, block 28.

Operating mode in case of failure (indistinctly failure of one of either electric motor or respective electronics)

The method determines which type of fault has occurred and, in case of indistinctly failure in either of the two electric motors 5A or 5B or their respective electronics, block 29, then a step of actuating the electric brake 12A or 12B is actuated to stop the rotation of the lead nut 8 or 9 on the side of the faulty motor/electronics is provided, block 30.

For example, the brake 12A stops the rotation of the lead nut 8 if the failure occurs in the motor 5A and/or its the command and control electronics.

This will involve the rototranslation of the intermediate stage 10 along the axis of rotation X due to the rotation of the lead nut 9 driven by the electric motor 5B. Due to the rotation-preventing device 7, the screw shaft 6 translates along the axis of rotation X as a result of the translation and rotation of the intermediate layer 10 as the latter is coupled by its thread 10C with the thread 6A of the screw shaft 6.

The translation of the screw shaft 6 provides the linear reciprocating motion, still along the axis of rotation X of the pushing member 3.

Operating mode in case of failure (jamming of the intermediate stage of the screw with either of the lead nuts)

The method determines which type of fault occurred and if the failure is a mechanical failure (or jamming) of the intermediate stage 10 with either of the lead nuts 8 or 9, block 31, e g jamming of the intermediate stage 10 with the lead nut 8, then a step of actuating the two electric motors 5A and 5B by their respective electronics in the same direction of rotation is provided, block 32.

In this scenario, the intermediate stage 10 rotates about the axis of rotation X in rigidly joined fashion with the two lead nuts 8 and 9. Due to the presence of the rotation-preventing device 7, the screw shaft 6 translates along the axis of rotation X to thereby provide a linear reciprocating motion, still along the axis of rotation X of the pushing member 3.

Operating mode in case of failure (jamming of the screw shaft with the intermediate stage of the screw)

The method determines which type of fault occurred and if the failure is a failure (or jamming) of the screw shaft 6 with the intermediate stage 10, block 33, then a step of actuating the two electric motors 5A and 5B by their respective electronics in opposite directions of rotation is provided in which, block 34.

In this scenario, the torque of one motor is counterbalanced by the torque of the other motor and the intermediate stage 10 only moves along the axis of rotation X. The screw shaft 6 translates along the axis of rotation X in rigidly joined fashion with the intermediate stage 10, to thereby provide a linear reciprocating motion, still along the axis of rotation X of the pushing member 3.

Those skilled in the art will obviously appreciate that a number of changes and variants as described above may be made to fulfill particular requirements, without departure from the scope of the invention, as defined in the following claims.

The invention claimed is:

1. A method of assessing presence of electrical, electronic, and/or mechanical fault in an electromechanical linear actuator (1), said electromechanical linear actuator, the electromechanical linear actuator comprising:
- a containment structure;
- independent first and second lead nuts, each having its own thread and its own thread direction;
- two electric motors in the containment structure, operably connected with the first and second lead nuts to rotate them about an axis of rotation;
- a shaft inserted in the first and second lead nuts;
- a rotation-preventing mechanism operable on the shaft to prevent the shaft from rotating about the axis of rotation;
- coupling means configured to mechanically couple the first and second lead nuts with the shaft, so that a rotational movement of the first and/or second lead nuts will cause a translation of the shaft along the axis of rotation;
- first and second electric brakes, operable on the first and second lead nuts respectively, to brake their rotation about the axis of rotation; and
- command and control electronics for each electric motor and electric brake, comprising a plurality of sensors in the containment structure operatively connected with the command and control electronics, wherein the plurality of sensors is configured to detect a position of the shaft so as to detect its movements along the axis of rotation;

the coupling means comprising:
an intermediate coupling stage inserted in the first and second lead nuts;
respective first mechanical connection means for coupling the intermediate coupling stage with each lead nut; and
second mechanical connection means;
wherein the shaft is fitted into the intermediate coupling stage and is connected with the intermediate coupling stage through the second mechanical connection means;

the method comprising:
actuating the two electric motors to drive the first and second lead nuts in a same direction of rotation or in opposite directions of rotation;
during the actuating of the two electric motors, checking via the plurality of sensors whether the shaft translates relative to the containment structure and whether the shaft does not translate relative to the containment structure;
checking whether there is a mechanical failure of the intermediate coupling stage with either of the first and second lead nuts, to thereby actuate the two electric motors in the same direction of rotation; and
checking whether there is a mechanical failure of the shaft with the intermediate coupling stage, to thereby actuate the two electric motors in the opposite directions of rotation.

2. The method of claim 1, wherein the actuating of the two electric motors has a predetermined actuation interval having a fixed or variable repetition frequency.

3. The method of claim 1, further comprising, if the shaft does not translate relative to the containment structure:
checking whether one or both of the two electric motors or the command and control electronics have a breakdown; and
actuating the first and second electric brakes to prevent rotation of the first or second lead nuts on a side of a faulty motor/electronics.

4. The method of claim 1, wherein the shaft is a screw shaft and the second mechanical connection means comprises a nut and screw coupling between the screw shaft and the intermediate coupling stage, such that a rotational movement of the first and/or second lead nuts causes a rotational, translational, or rototranslational movement of the intermediate coupling stage along the axis of rotation and the intermediate coupling stage in turn causes a translational movement of the screw shaft along the axis of rotation.

5. The method of claim 1, wherein each of the respective first mechanical connection means comprises a nut and screw coupling.

6. The method of claim 1, wherein a thread pitch of the screw shaft is different from a thread pitch of the first and second lead nuts.

7. The method of claim 1, wherein a pitch of the thread of the first lead nut is oriented in a direction opposite to a pitch of the thread of the second lead nut.

8. The method of claim 1, wherein the intermediate coupling stage has:
externally, first and second threads, each configured to couple with a respective lead nut; and
internally, a third thread configured to be coupled with the thread of the screw shaft.

9. The method of claim 8, wherein the first thread is located proximate to a first terminal end of the intermediate coupling stage, and
wherein the second thread is located proximate to a second terminal end opposite to the first terminal end of the intermediate coupling stage.

* * * * *